(12) United States Patent
Rishkel et al.

(10) Patent No.: US 11,646,554 B2
(45) Date of Patent: May 9, 2023

(54) HOOK KNIFE WITH INTEGRAL GUARD

(71) Applicant: Consolidated Edison Company of New York, Inc., New York, NY (US)

(72) Inventors: Richard Rishkel, Medford, NY (US); Christopher M. Fox, Poughquag, NY (US)

(73) Assignee: CONSOLIDATED EDISON COMPANY OF NEW YORK, INC., New York, NY (US)

( * ) Notice: Subject to any disclaimer, the term of this patent is extended or adjusted under 35 U.S.C. 154(b) by 0 days.

(21) Appl. No.: 17/197,641

(22) Filed: Mar. 10, 2021

(65) Prior Publication Data
US 2022/0294197 A1 Sep. 15, 2022

(51) Int. Cl.
*H02G 1/12* (2006.01)

(52) U.S. Cl.
CPC ................................ *H02G 1/1219* (2014.07)

(58) Field of Classification Search
CPC ... H02G 1/1224; H02G 1/1229; H02G 1/1241
USPC .................. 83/880; 30/90.1–91.2, 182–185, 30/241–243, 90.6, 90.8, 90.7, 90.9, 155, 30/293; 81/9.4, 9.41, 9.44
See application file for complete search history.

(56) References Cited

U.S. PATENT DOCUMENTS

| | | | | |
|---|---|---|---|---|
| 3,898,733 | A * | 8/1975 | Cormier | H02G 1/1217 30/294 |
| 4,574,480 | A * | 3/1986 | Dunn | B23D 19/04 30/240 |
| 4,953,293 | A | 9/1990 | Sterlacci | |
| 6,058,606 | A * | 5/2000 | Hepworth | H02G 1/1224 30/91.2 |
| 6,233,832 | B1 * | 5/2001 | Berns | B26B 5/00 30/162 |
| 7,171,753 | B2 | 2/2007 | Korczak et al. | |
| 8,109,002 | B2 | 2/2012 | Frazer | |
| 2007/0271796 | A1 * | 11/2007 | Oikarinen | B25G 3/06 30/169 |
| 2015/0128425 | A1 * | 5/2015 | Wilcox | H02G 1/1229 30/90.1 |
| 2016/0006225 | A1 * | 1/2016 | Watkins | H02G 1/1241 30/91.2 |
| 2016/0036206 | A1 * | 2/2016 | Zhang | H02G 1/126 83/13 |
| 2016/0141849 | A1 * | 5/2016 | Lin | H02G 1/1224 30/91.2 |
| 2018/0054047 | A1 * | 2/2018 | Fackler | H02G 1/12 |

OTHER PUBLICATIONS

KNIPEX Tools LP—KNIPEX "Dismantling Knife" Retrieved from Internet: URL:https://knipex-tools com/index.php?id=1023&page=group_detail&paren. [retrieved Jun. 14, 2021] pp. 1-3.

* cited by examiner

*Primary Examiner* — Ghassem Alie
(74) *Attorney, Agent, or Firm* — Cantor Colburn LLP

(57) ABSTRACT

A hook knife, a method of using the hook knife, and a guard body are provided. The hook knife includes a handle and a blade extending from the handle. A guard body is coupled to the handle and disposed about the blade, the guard body defining a first u-shaped channel extending perpendicular to the blade, the blade being at least partially disposed within the first u-shaped channel.

7 Claims, 11 Drawing Sheets

HOOK KNIFE WITH INTEGRAL GUARD

BACKGROUND OF THE DISCLOSURE

The subject matter disclosed herein relates to a hook knife, and in particular to a hook knife used in the stripping of insulator material from electrical conductors.

Electrical conductors are used to transfer electrical power from a generation or storage location to an end load. Electrical conductors typically are comprised of an electrically conductive core member that is surrounded by one or more layers of an insulation material. In order to use the electrical conductor, the electrician or utility lineman needs to prepare the conductor by removing a portion of the insulative layers to expose the core member. The core may then be connected or spliced with other electrical conductors or connected to an electrical device.

Traditionally, the removal of the insulative materials was performed in two steps. The electrical conductor would be cut about the circumference of the conductor (colloquially referred to as "ringing") and also axially from the end to the point of the circumferential cut (colloquially referred to as "skinning"). It is desired to remove the insulation materials without substantially cutting into the core member. To perform these cutting activities, the electrician or lineman used a hook knife 100, such as the one shown in FIG. 1.

The hook knife 100 typically includes a handle 102 made from a plastic material. Extending from the handle 102 is a blade 104 having a cutting edge 106. The cutting edge 106 has a slightly curved shape. To perform an action on the electrical conductor, the operator places the cutting edge on the conductor slices through the insulation material. It should be appreciated that there is a degree of skill required by the operator to cut through insulation material without damaging the conductor. Further, the operator needs to use the hook knife in an intended manner to avoid damaging surrounding objects.

Accordingly, while existing hook knife tools are suitable for their intended purposes the need for improvement remains, particularly in providing a hook knife having the features described herein.

BRIEF DESCRIPTION OF THE DISCLOSURE

According to one aspect of the disclosure a hook knife is provided. The hook knife includes a handle and a blade extending from the handle. A guard body is coupled to the handle and disposed about the blade, the guard body defining a first u-shaped channel extending perpendicular to the blade, the blade being at least partially disposed within the first u-shaped channel.

In addition to one or more of the features described herein, or as an alternative, further embodiments of the hook knife may include the guard body further defining a second u-shaped channel extending parallel with the blade, the blade being at least partially disposed within the second u-shaped channel. In addition to one or more of the features described herein, or as an alternative, further embodiments of the hook knife may include the guard body having a first u-shaped slot and a second u-shaped slot, the first u-shaped slot and second u-shaped slot being spaced apart to define the second u-shaped channel. In addition to one or more of the features described herein, or as an alternative, further embodiments of the hook knife may include first u-shaped slot being disposed further from the blade than the second u-shaped slot. In addition to one or more of the features described herein, or as an alternative, further embodiments of the hook knife may include the second u-shaped channel being disposed on an angle relative to the first u-shaped channel.

In addition to one or more of the features described herein, or as an alternative, further embodiments of the hook knife may include the guard body further having an opening extending therethrough, the blade being at least partially disposed in the opening, the opening being wider than the blade. In addition to one or more of the features described herein, or as an alternative, further embodiments of the hook knife may include the guard body including a first portion having a first wall with a first slot and a second portion having a second wall with a second slot, the first slot and second slot defining the first u-shaped channel. In addition to one or more of the features described herein, or as an alternative, further embodiments of the hook knife may include the guard body being removably coupled to the handle.

According to another aspect of the disclosure a method of using a hook knife to cut an electrical conductor is provided. The method includes placing the electrical conductor into a first u-shaped channel of a guard body of the hook knife. The electrical conductor is cut into until the electrical conductor is fully inserted into the first u-shaped channel. The hook knife is moved about the circumference of the electrical conductor to cut through insulation layers of the electrical conductor.

In addition to one or more of the features described herein, or as an alternative, further embodiments of the method may include placing the electrical conductor into a second u-shaped channel of the guard body on the hook shaped knife, and moving the hook knife axially along the electrical conductor to cut through insulation layers of the electrical conductor. In addition to one or more of the features described herein, or as an alternative, further embodiments of the method may include visually aligning a blade of the hook knife by looking through an opening in the guard body, the blade being at least partially disposed within the opening. In addition to one or more of the features described herein, or as an alternative, further embodiments of the method may include the step of placing the electrical conductor in the second u-shaped handle further includes disposing the hook knife on angle relative to the electrical conductor.

According to yet another aspect of the disclosure, a guard body for a hook knife is provided where the hook knife has a handle with a blade extending from one end. The guard body includes a first body having a first recess sized and shaped to receive at least a portion of the handle adjacent the blade, the first body further having a first arm and a second arm that define a first u-shaped slot. A second body is coupled to the first body, the second body having a second recess sized and shaped to receive at least a portion of the handle adjacent the blade, the second body further having a third arm and a fourth arm that define a second u-shaped slot, the first u-shaped slot and second u-shaped slot being sized to receive an electrical conductor.

In addition to one or more of the features described herein, or as an alternative, further embodiments of the guard body may include the first arm and the third arm cooperating to define a third u-shaped slot. In addition to one or more of the features described herein, or as an alternative, further embodiments of the guard body may include the second arm and the fourth arm cooperating to define a fourth u-shaped slot, the third u-shaped slot and fourth u-shaped slot being sized to receive the electrical conductor.

In addition to one or more of the features described herein, or as an alternative, further embodiments of the guard body may include the first body further having a first slot formed on a side adjacent the blade and extending in a direction parallel with a width of the blade. In addition to one or more of the features described herein, or as an alternative, further embodiments of the guard body may include the second body further having a second slot formed on a side adjacent the blade and extending in the direction, the first slot and second slot defining an opening, the blade being at least partially disposed in the opening.

In addition to one or more of the features described herein, or as an alternative, further embodiments of the guard body may include an end of the first arm and an end of the third arm extend farther from the blade than an end of the second arm and an end of the fourth arm. In addition to one or more of the features described herein, or as an alternative, further embodiments of the guard body may include the third u-shaped slot having a first angled surface and the fourth u-shaped slot has a second angled surface, the second angled surface being aligned with the first angled surface.

In addition to one or more of the features described herein, or as an alternative, further embodiments of the guard body may include the first body and the second body being removably coupled to each other. In addition to one or more of the features described herein, or as an alternative, further embodiments of the guard body may include a first adapter removably coupled to the first u-shaped slot and a second adapter removably coupled to the second u-shaped slot, wherein the first adapter and second adapter define fifth u-shaped slot and a sixth u-shaped slot, the fifth u-shaped slot and sixth u-shaped slot being smaller than the first u-shaped slot and second u-shaped slot.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION OF THE DISCLOSURE

Figure 9:
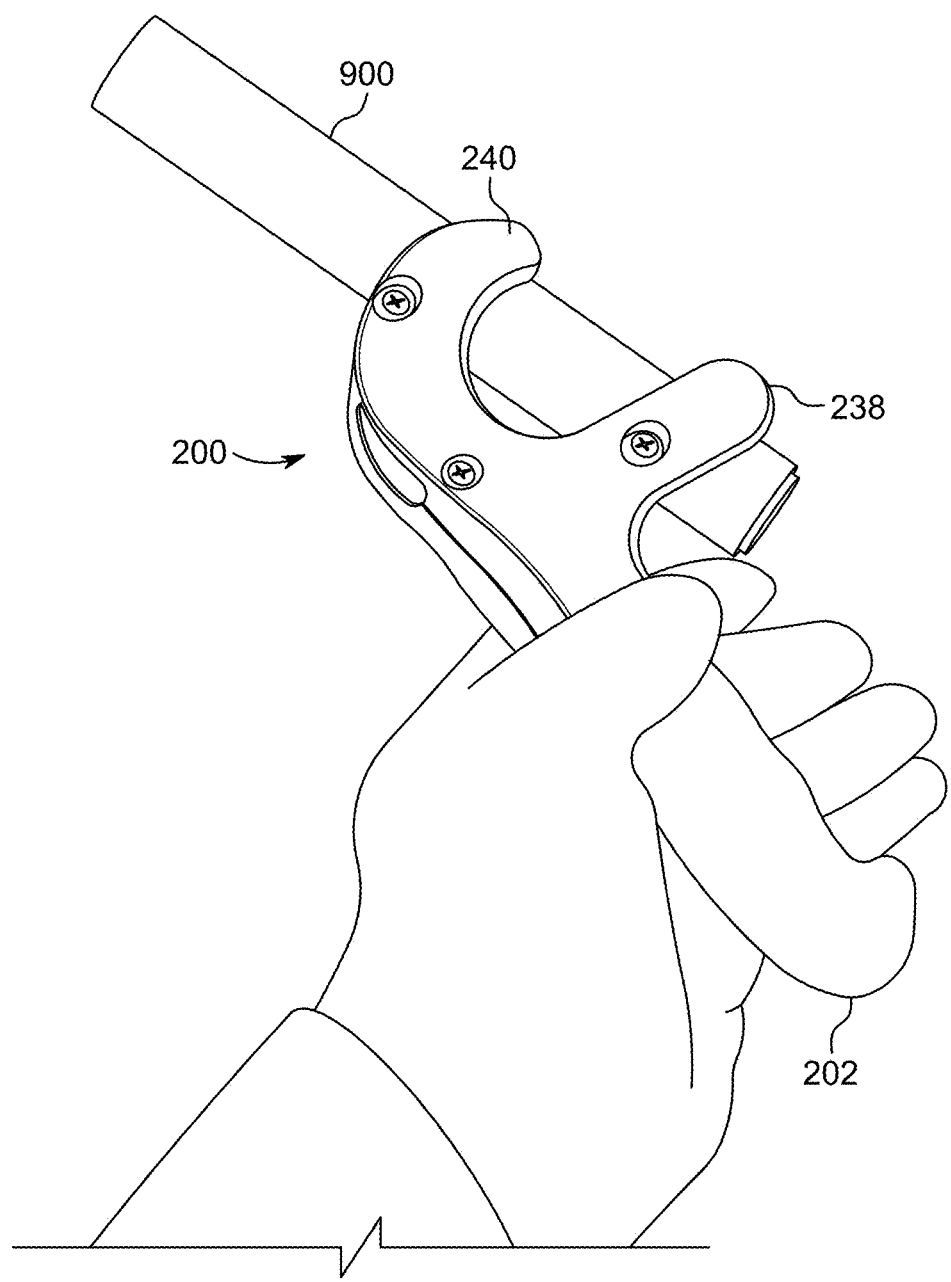
FIGS. 9-12 are a perspective views of the hook knife of FIG. 2 in different operating positions.
Figure 10:
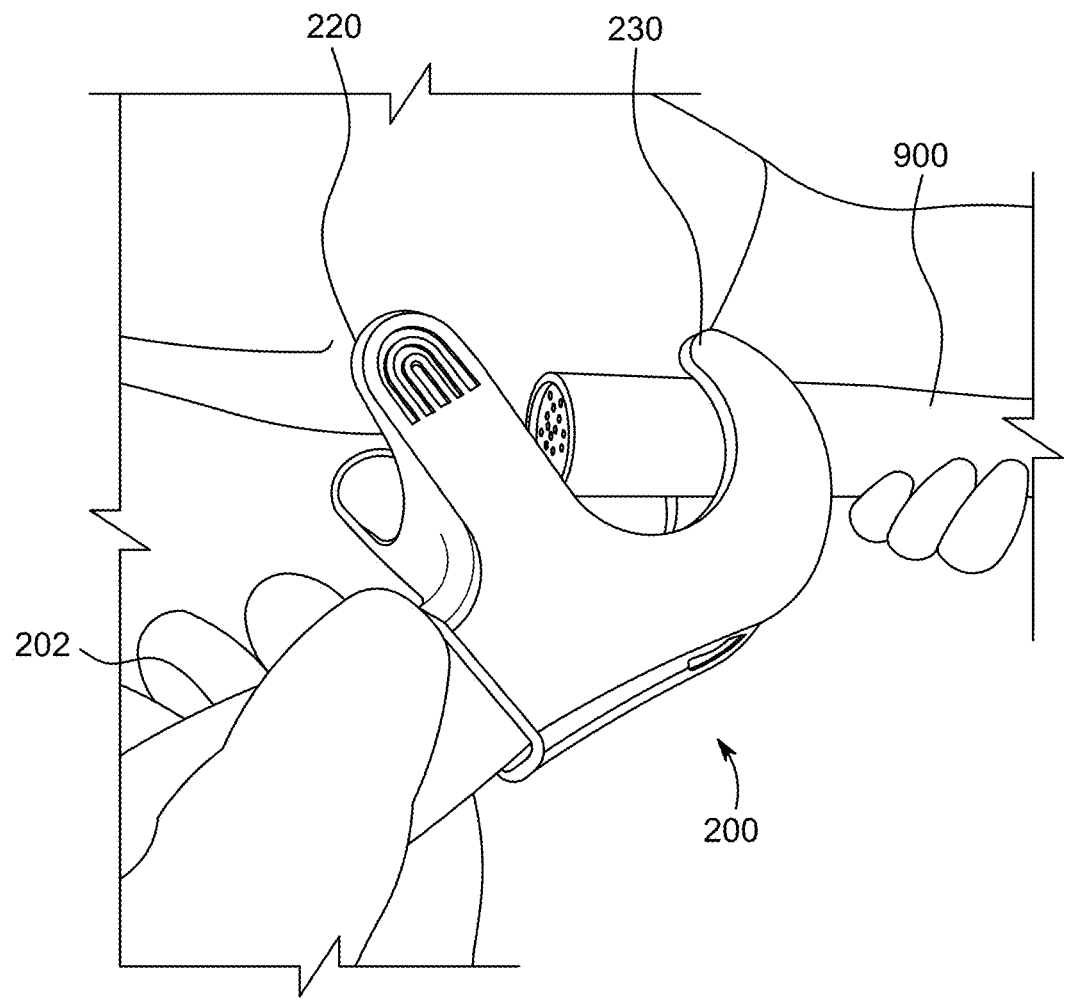
Figure 11:
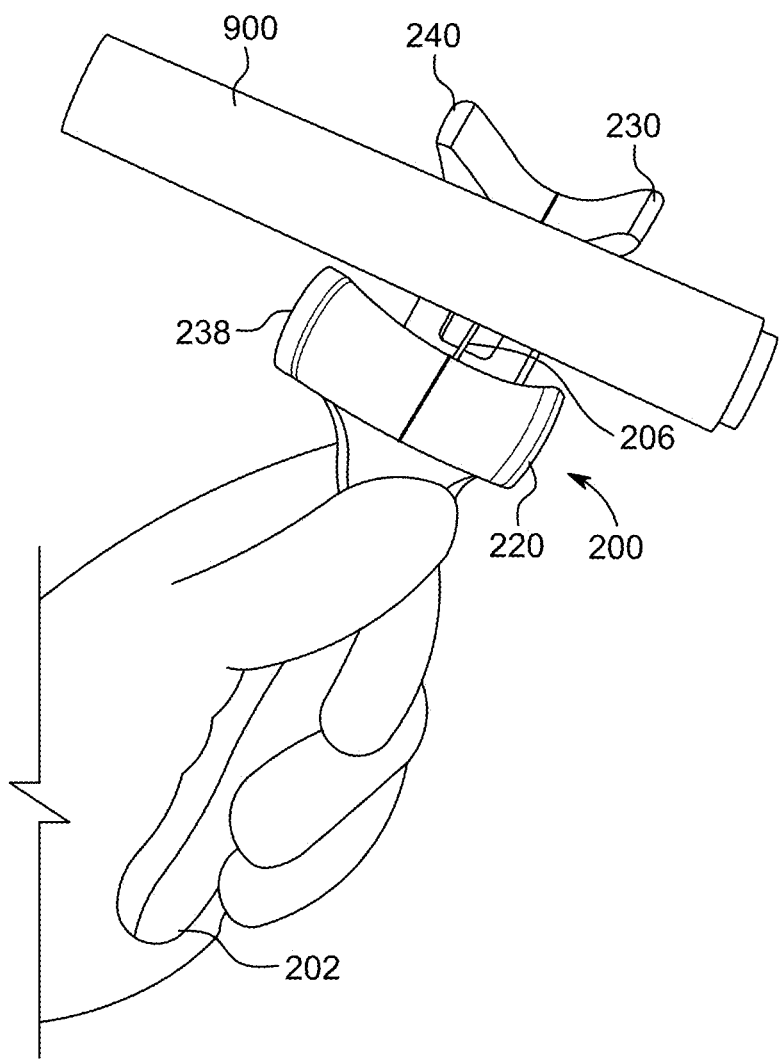
Figure 12:
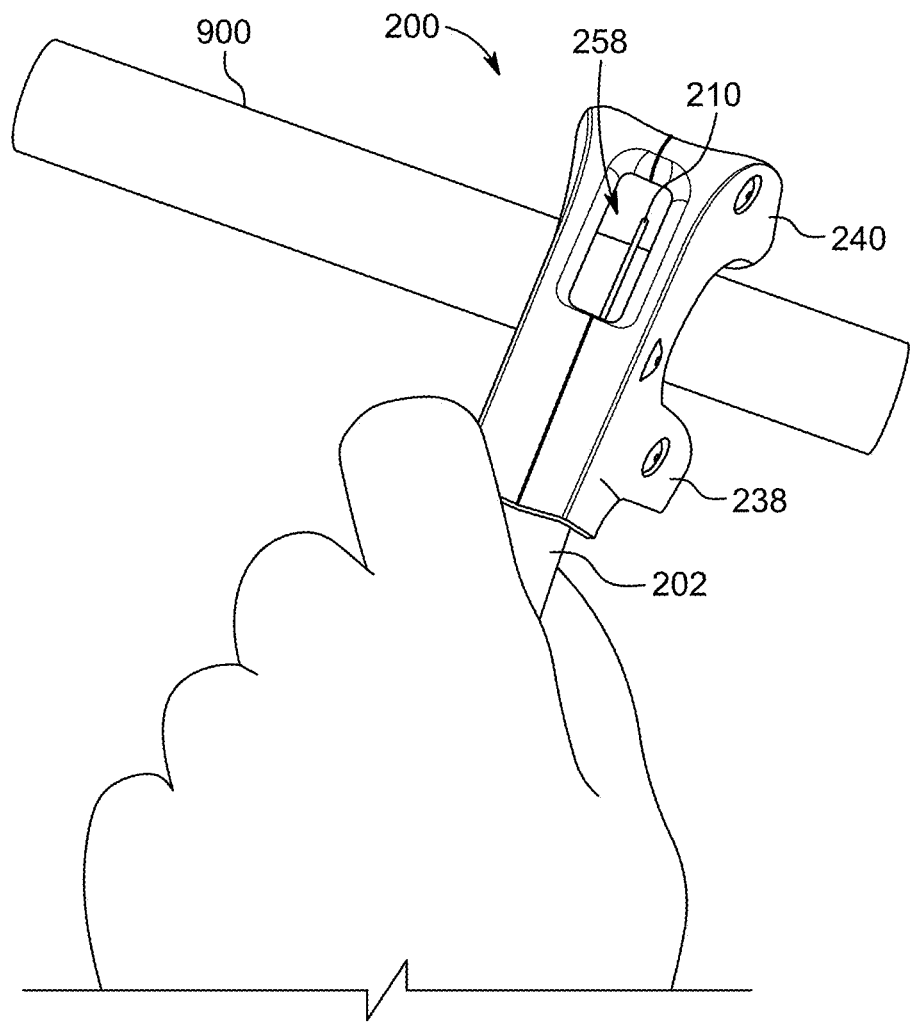

Embodiments of the present disclosure provide for hook knife for use with electrical conductors that facilitates the removal of layers of insulation from the electrical conductor. Embodiments of the present disclosure includes a hook knife with a guard that cooperates with a blade to cut through the layers of insulation. Still further embodiments of the present disclosure includes a hook knife with a guard that can be used to both cut circumferentially (ringing, FIG. 11 and FIG. 12) and axially or along the length of the electrical conductor (skinning, FIG. 9 and FIG. 10)).

In reference to FIGS. 2-7, an embodiment is shown of a hook knife 200. The hook knife 200 includes a handle 202 having a blade 204 extending from one end. In an embodiment, the hook knife 200 may be the same as hook knife 100. In an embodiment, the blade 204 is a generally thin member having a curved cutting edge 206 that ends in a tip 208. In an embodiment, the opposite side 210 from the edge 206 is planar and parallel with the longitudinal axis of the handle 202. The handle 202 is contoured 212 to be securely and comfortably held in the operators hand. In an embodiment, handle has a projection 214 adjacent the blade 202. In an embodiment, the projection 214 cooperates with the contour 212 to reduce the risk of the operators hand sliding forward during use.

Coupled to the handle 202 is a guard member 216. In an embodiment, the guard member 216 is removably coupled to the handle 202. It should be appreciated that in other embodiments, the guard member 216 may be integrally formed with the handle 202. The guard member 216 may comprise a first body 218 and a second body 220. In an embodiment the first body 218 and second body 220 are mirror images of each other about a plane 221 that extends through the blade 204.

The first body 216 includes a first arm 220 and a second arm 222 that cooperate to define a u-shaped slot 224 having a semi-circular end portion 226. In an embodiment, the first arm 220 is longer than the second arm 222 relative to the top of the end-portion 226. The first arm 220 and the second arm 222 further have a first semi-circular surface 228 and second semi-circular surface 230 respectively. In an embodiment the surfaces 228, 230 are perpendicular to the u-shaped slot 224. The top edge of the 229, 231 of the surfaces 228, 230 is angled relative to a longitudinal axis of the handle 202. As will be discussed in more detail herein, the edges 229, 231 are aligned, such that when the hook knife 200 is used to skin an electrical conductor 900 (FIG. 9), the hook knife 200 will be on an angle relative to the axis of the electrical conductor. In other words, the front of the hook knife 200 will be lower (closer to the surface of the conductor) than the rear portion of the handle 202.

The first body 216 further includes an inner side 232 that is coplanar with the plane 221. The side 232 has a recess 234 that is sized and shaped to receive the end of the handle 202 having the projection 214. A slot 236 is formed in the side 232 that extends through the first body 216.

In an embodiment, the second body 218 is a mirror image of the first body 216. The second body 218 includes a third arm 238 and a fourth arm 240. The arms 238, 240 cooperate to define a second u-shaped slot 242. The slots 224, 242 are aligned to define a first channel. The first channel is sized to receive an electrical conductor 900, such as a 500 mcm or 750 mcm sized cable for example. The arms 238, 240 each include a third semi-circular surface 244 and a fourth semi-circular surface 246.

The first semi-circular surface 228 and the third semi-circular surface 244 cooperate to define a third u-shaped slot 248. The second semi-circular surface 230 and fourth semi-circular surface 246 cooperate to define a fourth u-shaped slot 250. The third slot 248 and fourth slot 250 are aligned (on an angle relative to the longitudinal axis 252) to define a second channel. The slots 248, 250 are sized to receive an electrical conductor 900, such as a 500 mcm or 750 mcm sized cable for example.

Similar to the first body 216, the second body 218 includes a recess 252 on a side 254 (FIG. 8) that is sized and shaped to receive the projection 214 portion of the handle 202. A slot 256 is formed in the side 254 that extends through the second body 218. The slots 236, 256 cooperate to define a window or an opening 258 That has the blade 204 at least partially disposed therein. The opening 258 provides advantages in allowing the operator to align the blade 204 at the desired location on the electrical conductor 900.

In operation, the operator determines what types of actions are desired, naming the ringing (FIG. 11-12) or skinning (FIG. 9-10) of an electrical conductor 900. In the case of ringing, the operator places the electrical conductor 900 in the first channel and presses down causing the blade 204 to cut through the layers of insulation in the electrical conductor 900. The penetration of the edge 206 into the electrical conductor 900 stops when the outer surface of the electrical conductor contacts the end portion 226 (an the corresponding location in the second slot 242). In other words, the distance "d" (FIG. 4) between the end portion 226 and the edge 206 is arranged to provide a desired depth of cut that is equal to or greater than the thickness of the insulation layers of the electrical conductor 900. It should be appreciated that this provides advantages in improving the reliability and efficiency of the ringing operation since the desired depth of cut will be performed each time. Once the hook knife 200 is engages, the operator moves the hook knife 200 about the circumference of the electrical conductor 900 to complete the cut.

In a skinning operation, the operator places the electrical conductor 900 in the second channel and presses down causing the blade 204 to penetrate the layers of insulation. It should be appreciated that due to the angle of the second channel (as defined by the surfaces 229, 231) the tip 208 will penetrate the deepest into the insulation layers. The blade 204 is arranged relative to the surfaces 229, 231 such that the tip 208 cuts a distance equal to or greater than the thickness of the layers of insulation. In this way, when the operator moves the hook knife 200 axially along the electrical conductor 900, the tip 208 will cut through the last (deepest) layer of the insulation layers.

Figure 1:
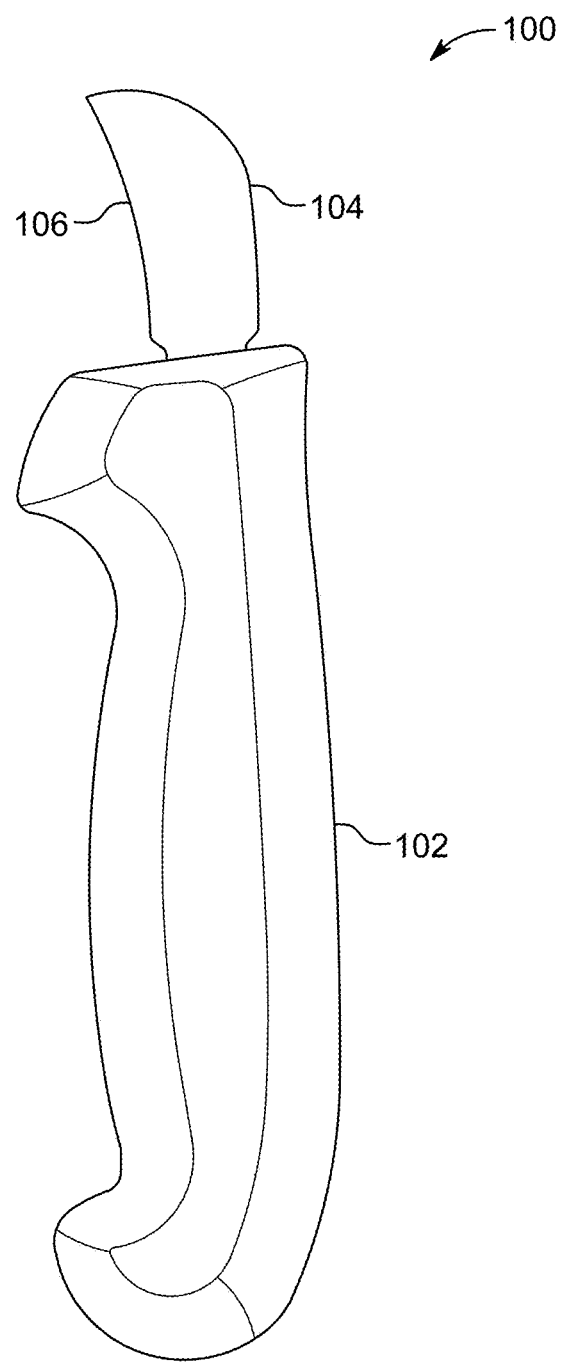
FIG. 1 is a side view of a prior art hook knife.
Figure 2:
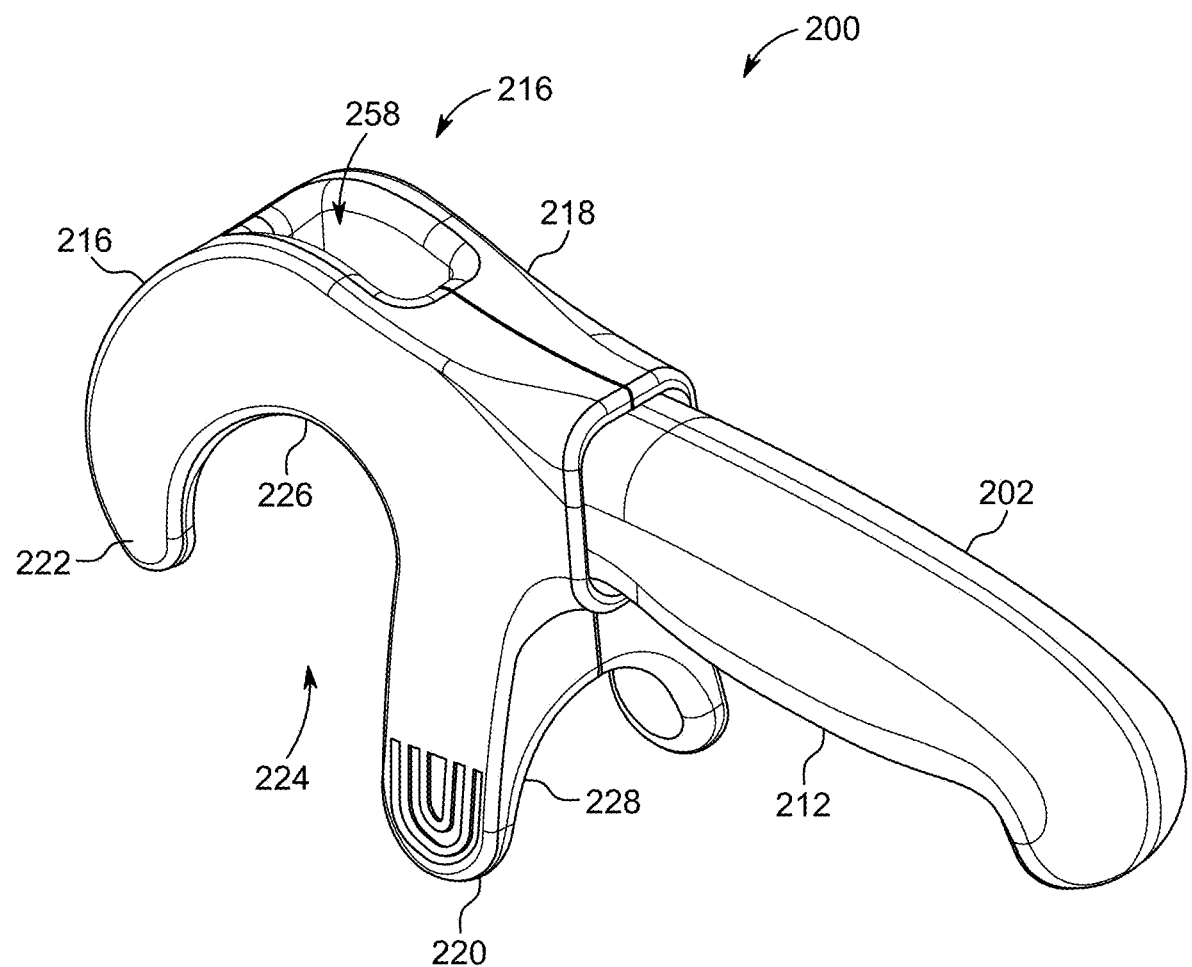
FIG. 2 is a perspective view of a hook knife in accordance with an embodiment.
Figure 3:
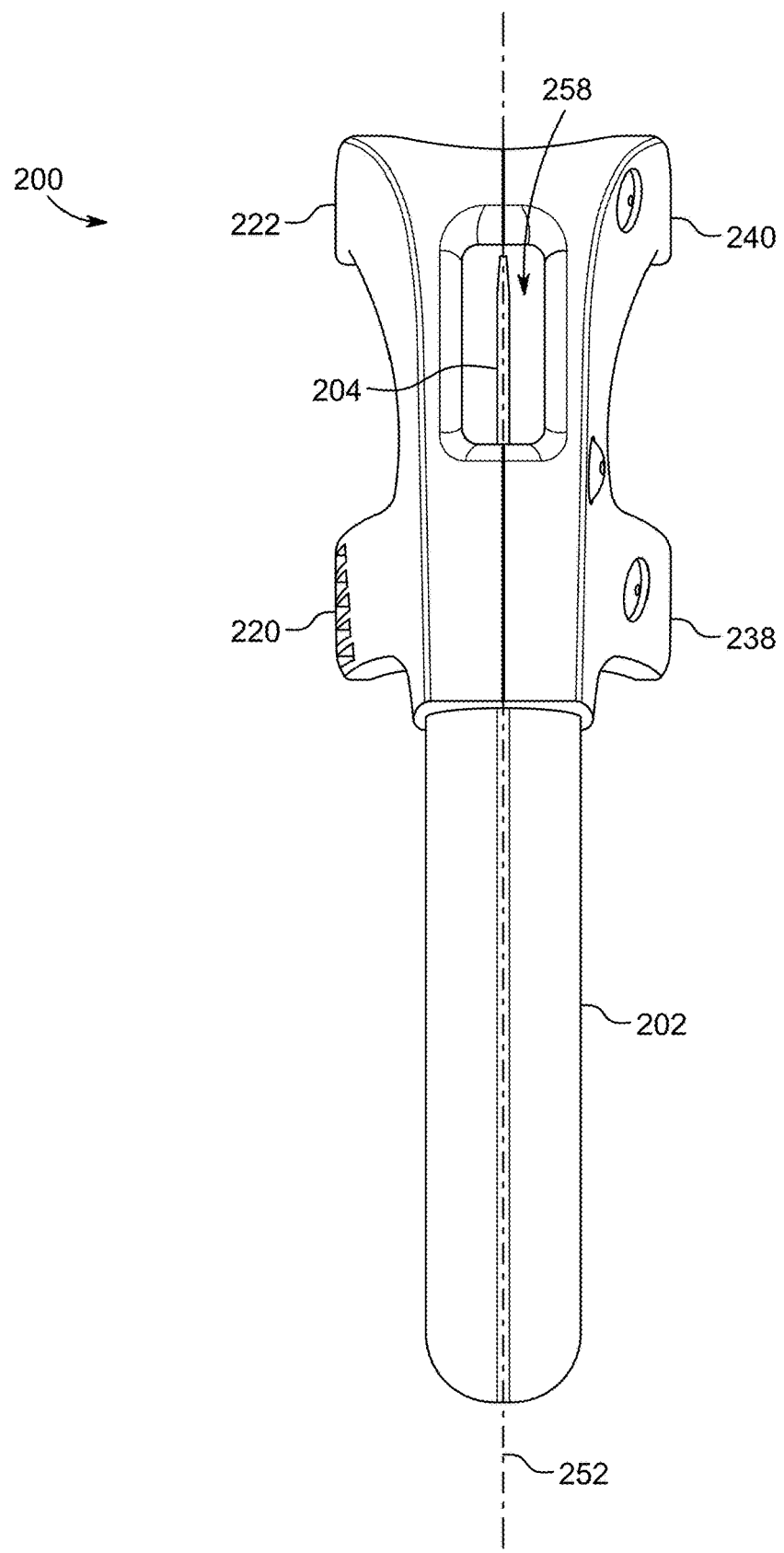
FIG. 3 is a top view of the hook knife of FIG. 2.
Figure 4:
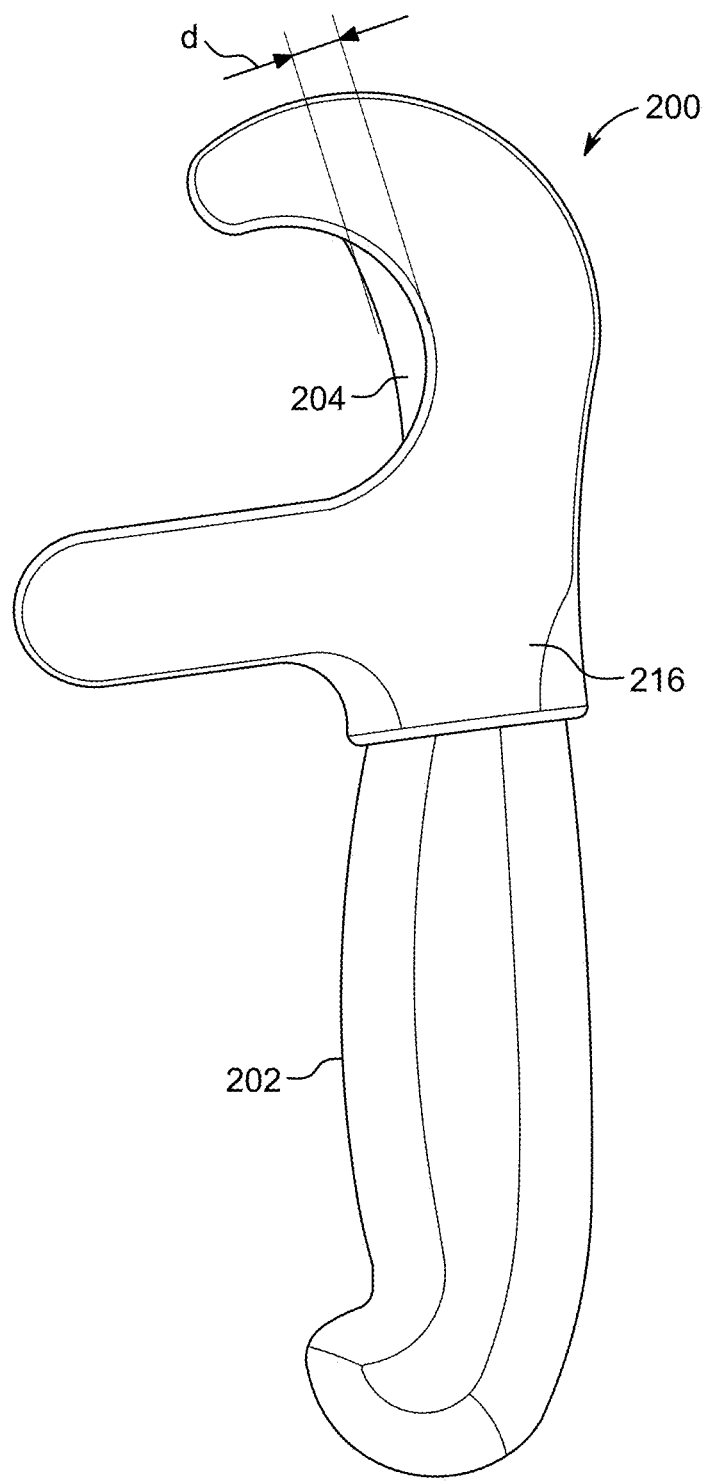
FIG. 4 is a side view of the hook knife of FIG. 2.
Figure 5:
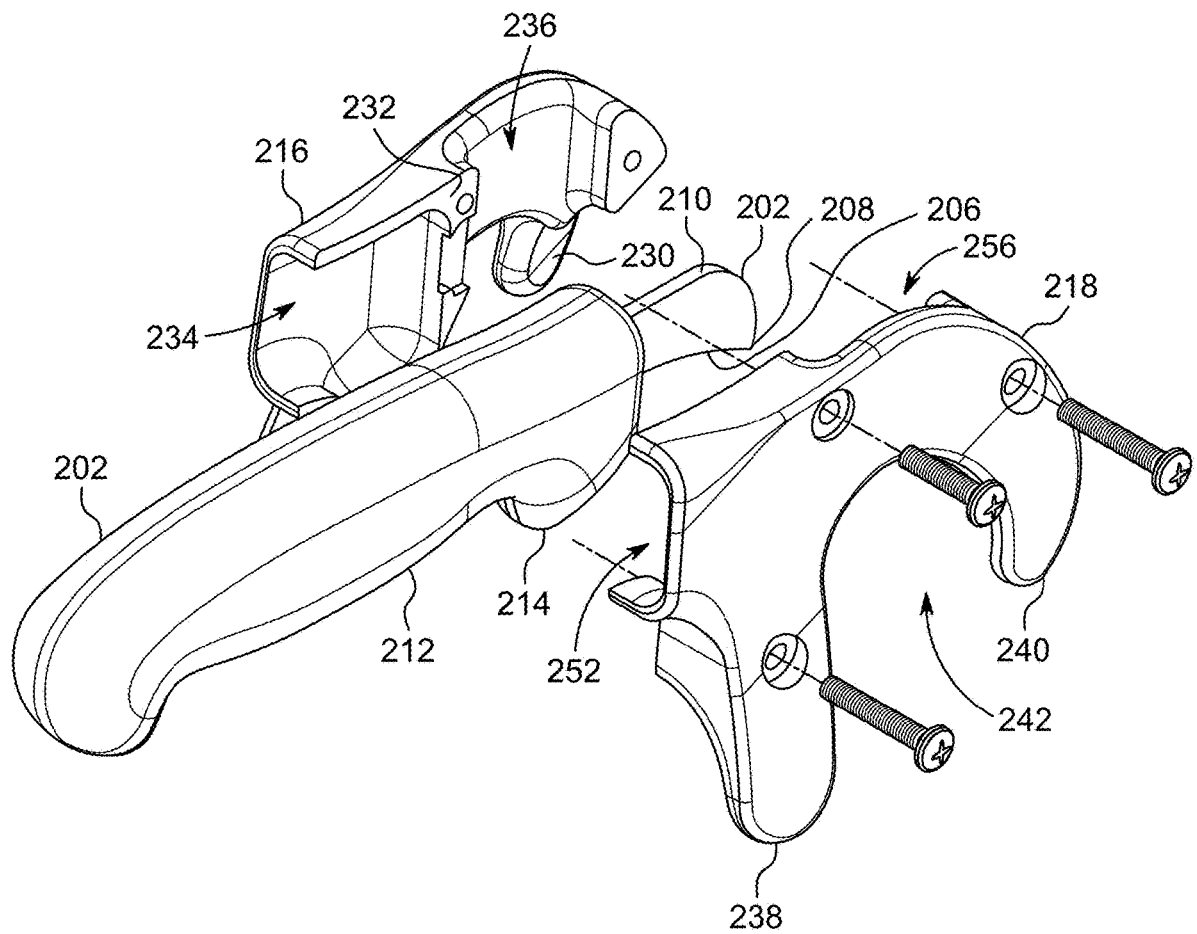
FIG. 5 is an unassembled perspective view of the hook knife of FIG. 2.
Figure 6:
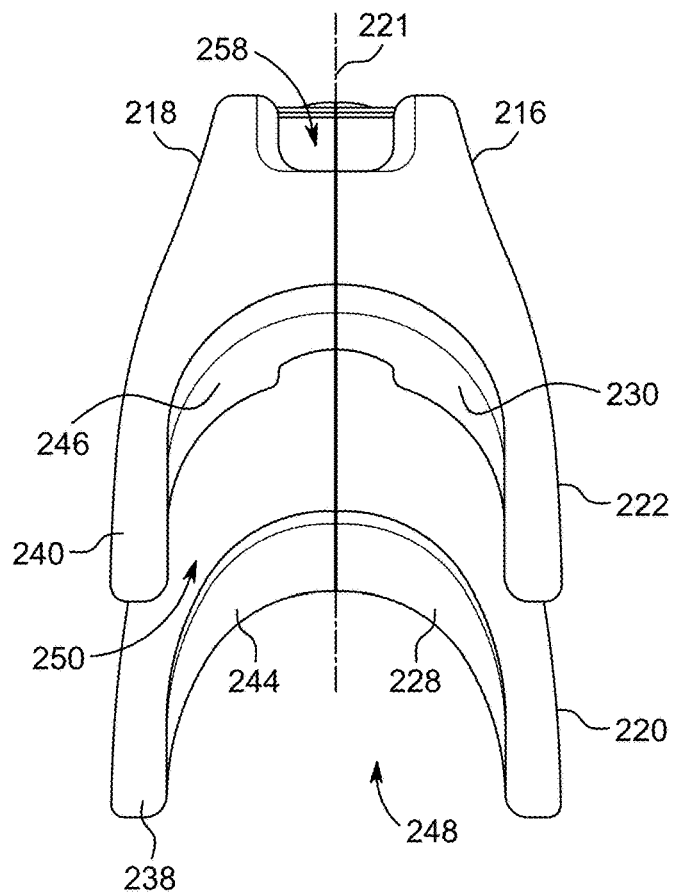
FIG. 6 is an end view of the guard portion of the hook knife of FIG. 2 in accordance with an embodiment.
Figure 7:
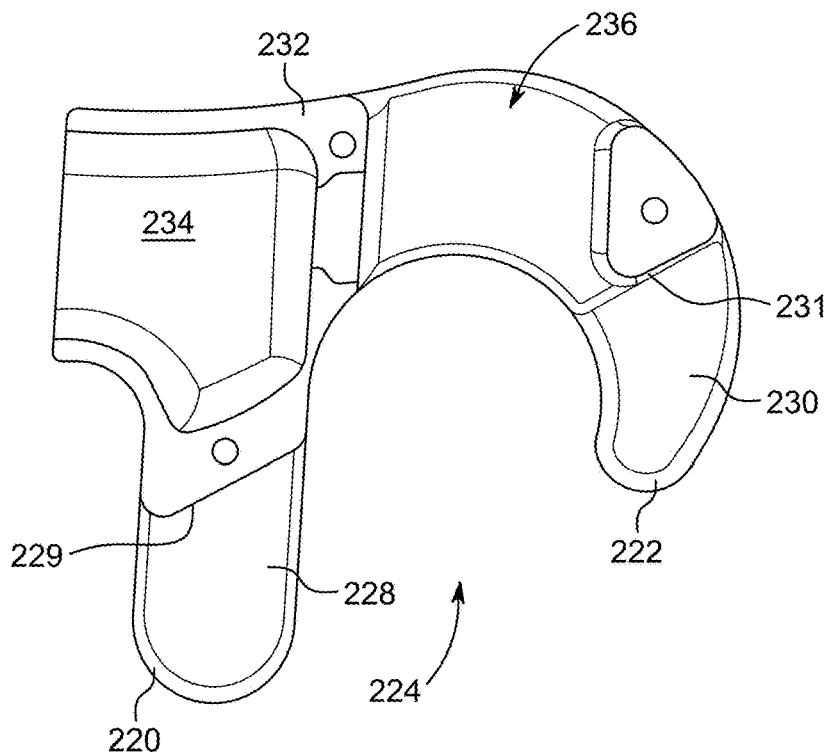
FIG. 7 is a side view of a body portion of the guard of FIG. 6.
Figure 8:
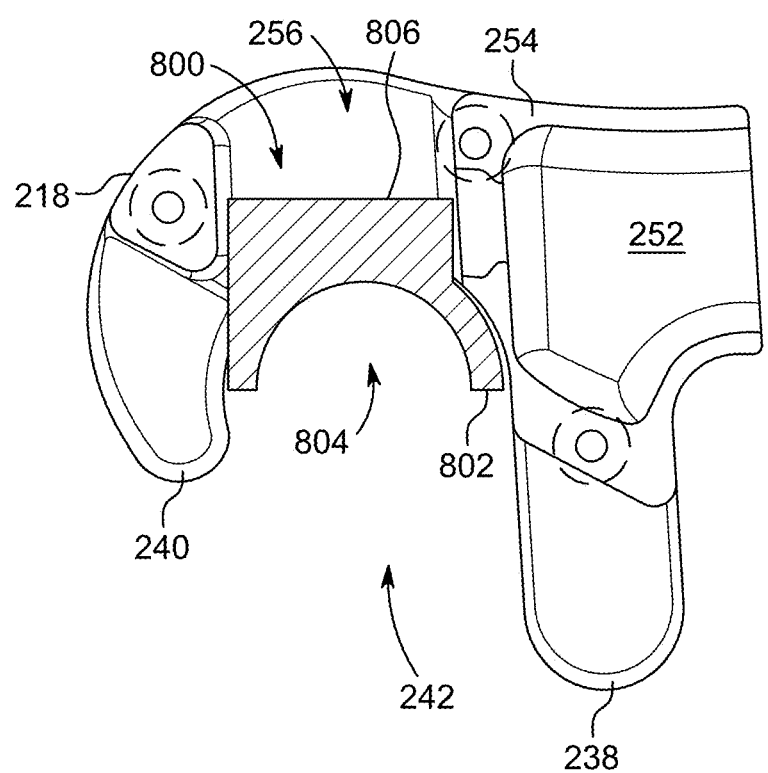
FIG. 8 is a side view of a body portion of the guard of FIG. 6 with an adapter in accordance with an embodiment.

Referring now to FIG. 8, another embodiment is shown that uses an adapter 800 to change the hook knife 200 to accommodate different size electrical conductors. In this embodiment, at least one adapter 800 includes a body 802 having a semicircular slot 804. The body 802 is configured to fit at least partially into the slot 224, 242. The adapter 800 may include a portion 806 that fits within the slot 236, 256. The semi-circular slot 804 is sized to receive an electrical conductor (i.e. smaller than the electrical conductor described in reference to FIG. 2-7) and position the blade 204 at a desired position to cut through the layers of insulation material. In an embodiment, the hook knife 200 may include two adapters 800, each a mirror image of the other, with each positioned in one of the bodies 216, 218. It should be appreciated that multiple adapters 800 may be provided for different size electrical conductors.

The term "about" is intended to include the degree of error associated with measurement of the particular quantity based upon the equipment available at the time of filing the application. For example, "about" can include a range of ±8% or 5%, or 2% of a given value.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection." It should also be noted that the terms "first", "second", "third", "upper", "lower", and the like may be used herein to modify various elements. These modifiers do not imply a spatial, sequential, or hierarchical order to the modified elements unless specifically stated.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A hook knife comprising:
a handle;
a blade extending from the handle, wherein the blade having a cutting edge; a guard body coupled to the handle and disposed about the blade, the guard body defining a first u-shaped channel extending perpendicular and transverse to the blade, the blade being at least partially disposed within the first u-shaped channel;
wherein the guard body includes a top end and a first portion having a first wall with a first arm and second arm that define a first slot and a second portion having a second wall with a third arm and fourth arm that define a second slot, the first wall being parallel with the second wall, the first slot and second slot defining the first u-shaped channel; and
wherein the first arm and third arm are longer than the second arm and fourth arm in a direction perpendicular to the cutting edge of the blade relative to the top end.

2. The hook knife of claim 1, wherein the guard body further defines a second u-shaped channel extending parallel with the blade, the blade being at least partially disposed within the second u-shaped channel.

3. The hook knife of claim 2, wherein the guard body includes a first u-shaped slot defined by the second arm and the fourth arm, and a second u-shaped slot defined by the first arm and third arm, the first u-shaped slot and second u-shaped slot being spaced apart to define the second u-shaped channel.

4. The hook knife of claim 3, wherein first u-shaped slot is disposed further from the blade than the second u-shaped slot.

5. The hook knife of claim 4, wherein the second u-shaped channel is disposed on an angle relative to the first u-shaped channel.

6. The hook knife of claim 1, wherein the guard body further includes an opening extending therethrough, the blade being at least partially disposed in the opening, the opening being wider than the blade.

7. The hook knife of claim 1, wherein the guard body is removably coupled to the handle.

\* \* \* \* \*